United States Patent [19]

Hoki et al.

[11] 3,956,208

[45] May 11, 1976

[54] AQUEOUS EPOXY RESIN COMPOSITION CONTAINING A FATTY ACID POLYAMIDE

[75] Inventors: Tsuneo Hoki; Kazuo Toyomoto; Hiroshi Komoto, all of Fuji, Japan

[73] Assignee: Asahi Kasei Kogyo Kabushiki Kaisha, Osaka, Japan

[22] Filed: Mar. 17, 1975

[21] Appl. No.: 559,208

[30] Foreign Application Priority Data
Mar. 15, 1974  Japan.................................. 49-29217

[52] U.S. Cl.................... 260/18 PN; 260/18 EP; 260/18 N; 260/29.2 EP; 260/37 EP; 260/830 P
[51] Int. Cl.².......................................... C08L 63/02
[58] Field of Search..... 260/18 PN, 18 EP, 29.2 EP, 260/830 P, 404.5, 18 N, 37 EP

[56] References Cited
UNITED STATES PATENTS

| | | | |
|---|---|---|---|
| 2,899,397 | 8/1959 | Aelony et al. | 260/18 PN |
| 3,778,394 | 12/1973 | Lovald et al. | 260/18 N |
| 3,816,366 | 6/1974 | Laudise | 260/18 PN |

FOREIGN PATENTS OR APPLICATIONS

| | | |
|---|---|---|
| 1,242,783 | 8/1971 | United Kingdom |
| 956,709 | 4/1964 | United Kingdom ............ 260/18 PN |
| 2,328,162 | 1/1974 | Germany |

*Primary Examiner*—Eugene C. Rzucidlo
*Attorney, Agent, or Firm*—Sughrue, Rothwell, Mion, Zion & Macpeak

[57] ABSTRACT

An epoxy resin aqueous composition of the room-temperature hardening type having improved rust preventive, anti-corrosive and weatherproof properties, which comprises an aqueous dispersion containing A. an epoxy resin having at least two epoxy groups per molecule, and
B. a condensation product prepared by condensing
  i. a polyamine mixture of 4-aminomethyl-octamethylene-diamine and a polyalkylenepolyamine represented by the general formula (III)

$$H_2N - R - NH - (RNH)_n - H \qquad (III)$$

wherein $R$ is a straight-chain alkylene group having 2 to 4 carbon atoms and $n$ is 0 or an integer of 1 to 6, with
  ii. a reaction product of
  a. an $\alpha,\beta$-unsaturated carboxylic acid or an ester thereof represented by the following general formula (I) or (II)

$$Y - CH = CX - Y \qquad (I)$$

$$Y - C \equiv C - Y \qquad (II)$$

wherein $Y$ is a hydrogen atom, an alkyl group, an aryl group, a carboxyl group or an esterified carboxyl group with at least one of $Y$ being a free carboxyl group or an esterified carboxyl group; and $X$ is a hydrogen atom or a methyl group; and
  b. a natural or synthetic ethylenically unsaturated monocarboxylic fatty acid or an alkyl ester thereof.

7 Claims, No Drawings

AQUEOUS EPOXY RESIN COMPOSITION CONTAINING A FATTY ACID POLYAMIDE

BACKGROUND OF THE INVENTION

1. Field of the Invention

This invention relates to a novel epoxy resin aqueous paint composition and, in particular, to a novel epoxy resin aqueous paint composition which contains a special amide as a hardening agent to improve the rust preventive, anticorrosive and weatherproof properties.

2. Description of the Prior Art

Paints are usually prepared by dispersing a synthetic resin, a coloring agent and other auxiliary additives in an organic solvent. Since organic solvents are defective from the standpoint of sanitation, safety and air pollution in that they are toxic to the human body, inflammable in operation, easily cause fire and explosion and the like, it is highly desired to develop non-polluting and safe paints, for example, of an aqueous solution type, a non-solvent type or the like. In particular, development of aqueous paints of the room-temperature hardening type, i.e., those capable of being hardened at a temperature in the range of about 15° to 30°C for a period of about 6 to 24 hours, that are easily applicable for large structures such as vessels or bridges for which heat treatment is impossible.

Epoxy resin aqueous dispersions which do not contain any organic solvent are known and include a mixed aqueous emulsion of an epoxy resin and a polymeric polyamide, which is prepared by mixing in an aqueous medium an organic solvent solution of an epoxy resin with a condensation product of an aliphatic polyamine and a polycarboxylic fatty acid in the presence of a water-soluble organic carboxylic acid (as disclosed in U.S. Pat. No. 2,899,397), those which contain as a hardening agent an addition product of an aliphatic or aromatic monoepoxide and an aminoamide prepared from a fatty acid and an alkylenepolyamine (as disclosed in British Pat. No. 1,242,783). The use of these special hardening agents can provide coating compositions, e.g., paints which harden at room temperature and form films having excellent strength and water resistance properties. However, when such aqueous paints are coated on the surface of a metal, particularly steel, their rust preventive and anticorrosive properties are not sufficient, and the coated film has poor adhesion on immersion in fresh water or salt water. Therefore, these aqueous paints are not suitable at all for metal coating. Thus, epoxy resin paints of the room-temperature hardening type which are capable of being diluted with water and suitable for metal coating are thus far unknown.

SUMMARY OF THE INVENTION

Research has been conducted to develop epoxy resin aqueous paints which readily harden at room temperature and form coated films having excellent rust preventive and anticorrosive properties and, as a result, it has been found that the above object can be achieved by using a special polyamide or aminoamide as a hardening agent.

Thus, this invention provides an epoxy resin aqueous paint composition which comprises an aqueous dispersion containing a. an epoxy resin having at least two epoxy groups per molecule, and b. a condensation product prepared by condensing i. a polyamine mixture of 4aminoethyl-octamethylene-diamine and a polyalkylenepolyamine with ii. a reaction product of a. an α,β-unsaturated carboxylic acid or ester thereof represented by the following general formula (I) or (II)

$$Y - CH = CX - Y \qquad (I)$$

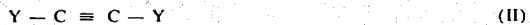

$$Y - C \equiv C - Y \qquad (II)$$

wherein Y represents a hydrogen atom, an alkyl group, preferably those having 1 to 2 carbon atoms, an aryl group, preferably a phenyl group, a carboxyl group or an esterified carboxyl group, with at least one of Y being a carboxyl group or an esterified carboxyl group; and X represents a hydrogen atom or a methyl group; and b. a natural or synthetic ethylenically unsaturated monocarboxylic fatty acid or an alkyl ester thereof.

DETAILED DESCRIPTION OF THE INVENTION

The aminoamide or polyamide hardening agents used in this invention can be readily prepared by condensing 4-aminomethyl-octamethylenediamine and a polyalkylenepolyamine with a modified fatty acid, which is prepared by reacting the above described α,β-unsaturated carboxylic acid or lower alkyl ester therof having 1 to 4 carbon atoms in the alkyl moiety, preferably a methyl ester, of the formula (I) or (II) with a natural or synthetic ethylenically unsaturated monocarboxylic fatty acid or the ester thereof, e.g., alkyl ester having 1 to 4 carbon atoms in the alkyl moiety, preferably a methyl ester, in a usual manner.

The reaction of the α,β-unsaturated carboxylic acid and the fatty acid is usually carried out in an inert atmosphere, e.g., in a nitrogen stream, at temperatures of about 20° to 300°C, preferably 20° to 230°C. The reaction can be effected in the presence or absence of a catalyst. Suitable examples of the catalysts which can optionally be used in the reaction are strong acids such as sulfuric acid, hydrochloric acid and the like, sulfonic acids such as toluenesulfonic acid and the like, sulfonic acid-type cation-exchange resins, Friedel-Crafts catalysts such as aluminum chloride, and the like. Although the reaction time depends upon the types of reactants and the temperature conditions, the reaction usually is completed within about 2 to 20 hours after the predetermined temperature is reached. The completion of the reaction can be confirmed by the acid value of the product which generally has an acid value in the range of from about 180 to about 250, preferably from 180 to 235, more preferably from 200 to 235.

The fatty acids used in the above condensation reaction can be any of the natural or synthetic ethylenically unsaturated monocarboxylic fatty acids having 8 to 24 carbon atoms or the alkyl esters thereof, and they can be used individually or as a mixture of two or more thereof.

Examples of suitable unsaturated fatty acids include linoleic acid, linolenic acid, arachidonic acid, punicic acid, α-eleostearic acid, parinaric acid, licanic acid and α-oxylinolenic acid, and esters thereof such as methyl linoleate, ethyl linoleate, methyl linolenate, ethyl linolenate and the like. Of all, linoleic acid, linolenic acid or α-eleostearic acid, or natural fatty acids containing these acids as essential components, or mixtures thereof are preferred since they are easily available.

Suitable examples of the natural fatty acids are linseed oil, corn oil, soybean oil, tung oil and the like. These fatty acids are preferred since they exhibit high reactivity with α,β-unsaturated carboxylic acids or the esters thereof, excellent airdrying and coated films physical properties. A suitable range of the number of ethylenically unsaturated bonds present in the chain of these fatty acids is 2 to 4.

As described above, the α,β-unsaturated carboxylic acid or ester thereof is represented by the general formula (I) or (II)

 (I)

 (II)

wherein Y represents a hydrogen atom, an alkyl group, an aryl group, a carboxyl group, or an esterified carboxyl group, with at least one of Y being a carboxyl group or an esterified carboxyl group; and X represents a hydrogen atom or a methyl group. Suitable examples of the alkyl groups are those having 1 to 2 carbon atoms, i.e., a methyl or ethyl group, and a suitable example of the aryl group is a phenyl group.

Examples of suitable α,β-unsaturated carboxylic acids are acrylic acid, methacrylic acid, styrenecarboxylic acid, maleic acid, acetylenecarboxylic acid and acetylenedicarboxylic acid. These α,β-unsaturated carboxylic acids can be used per se or as the esters thereof with a lower alcohol. They can be used individually or as a mixture of two or more thereof.

Although the molar ratio of the α,β-unsaturated carboxylic acid to the fatty acid can be varied optionally, preferably 1 mol of the α,β-unsaturated carboxylic acid is reacted with about 0.2 to 1.0 mol of the fatty acid from the standpoint of the hardening rate of the coated film, pot life, or the like. The above reaction is believed to belong to the diene addition, Diels-Alder reaction, or like reaction types, but the definite reaction mechanism is not clear. In this connection, reference can be made to Bickford et al, *Oil and Soap*, Vol. 19, p. 23, 1942.

The condensation reaction for preparing the aminoamide or the polyamide used in this invention is usually carried out at temperatures of about 100° to 325°C, preferably 180° to 300°C. The reaction time somewhat varies depending upon the temperature conditions, but the reaction is usually completed within about 2 to 8 hours after the predetermined temperature is reached.

Referring to the polyamines used in this invention, 4-aminomethyl-octamethylenediamine is a novel aliphatic triamine in the art and can be readily obtained by subjecting 1,3,6-tricyanohexane, which is prepared by an electric reduction of acrylonitrile, to a reductive hydrogenation. That is, 4-amino-methyl-octamethylenediamine can be easily obtained by hydrogenating 1,3,6-tricyanohexane obtained by the electroreductive reaction of acrylonitrile under pressure and in the presence of a hydrogenating catalyst such as Raney nickel.

The polyalkylenepolyamines are represented by the general formula (III)

 (III)

wherein R is a straight-chain alkylene group having 2 to 4 carbon atoms and n is 0 or an integer of 1 to 6. Examples of polyalkylenepolyamines are ethylenediamine, diethylenetriamine, triethylenetetramine, tetraethylenepentamine, di-1,3-propanetriamine, tri-1,3-propanetetramine and di-1,2-propanetriamine. These examples are particularly advantageous since they can provide excellent water-dispersibility of the hardening agent and physical properties of the coated film, in particular, water-resistance. The alkylene group in the above general formula (III) is usually an ethylene group but is not limited thereto. If desired, the above polyamines can be further combined with aromatic polyamines such as phenylenediamine or xylylenediamine or alicyclic polyamines such as cyclohexanediamine or isophoronediamine as a modifying agent. These modifying agents can be generally used in an amount of from about 5 to about 30% by weight based on the weight of the mixture of the polyamines.

Referring to the polyamines used in this invention, the molar ratio of the 4-aminomethyl-octamethylenediamine to the polyalkylenepolyamine can be optionally selected, but preferably ranges from about 1:4 to 4:1. The modified fatty acid and the polyamine are generally used in a ratio of about 0.3 to 1.3 mols of the polyamine to 1 equivalent of the acid. The use of less than about 0.3 mols of the polyamine is not preferred since the unreacted carboxyl groups in the condensation product are increased and free carboxyl groups remain in the hardened coated film, resulting in a reduction in the water resistance property, as well as rust preventive and anitcorrosive properties. In this case, if the reaction conditions are selected so as to minimize the presence of free carboxyl groups, the viscosity of the condensation product is increased and the dispersibility in water and workability are remarkably reduced. On the other hand, the use of more than about 1.3 mols of the polyamine is also not preferred since the hardness of the hardened coated film is increased and, therefore, this composition can not be used in applications requiring flexibility and shock resistance. Moreover, the amount of unreacted polyamine is increased, which produce unfavorable effects such as an unpleasant odor or toxicity to the skin.

The aminoamide or polyamide used in this invention can be prepared by condensing the modified fatty acid and each component of mixed polyamines individually and then mixing them, and used as a hardening agent. However, the use of a mixture of the polyamines is advantageous from the standpoint of production.

Typical polyamides or aminoamides which are used in this invention have an amine value (i.e., milligrams of potassium hydroxide corresponding to the amine alkalinity per 1 g of the sample) of about 350 to 890 and a viscosity of about 0.1 to 1,000 poise at ordinary temperatures (e.g., about 20° to 30°C).

The mechanism of the effects of the hardening agent used in this invention on the anticorrosive and rust preventive properties is not at the present completely clear and while not desiring to be found, it is believed to be as follows. That is, the hardening agent contains, as reaction components, amino groups capable of reacting with epoxy groups, as well as fatty acid components with air drying properties, and the hardening of the coated film proceeds by the reaction of the epoxy resin with the hardening agent and the crosslinking reaction through air drying of the hardening agent. Therefore, hardening is completed only when the aqueous medium in the paint sufficiently evaporates to enable the contact with air. Moreover, a satisfactory result in anticorrosive property is provided particularly when a mixture of 4-aminomethyl-octamethylenediamine and a polyalkylenepolyamine as the polyamine is used, which can be explained possibly by the following. 4-Aminomethyl-octamethylenediamine, which is one of the polyamine components, characteristically has three primary amino groups. The primary amino groups of the 4-aminomethyloctamethylenediamine remain in high concentration after the condensation reaction, which is different from conventional polyalkylenepolyamines, and in addition, the amino groups are bonded through a long methylene chain. Furthermore, 4-aminomethyloctamethylenediamine is more oleophilic than polyalkylenepolyamines (for example, when the hydrophilic properties of the linolic acid amide derived from a polyalkylenepolyamine and oleinic acid amide derived from 4-aminomethyl-octamethylenediamine are compared, the former is water-soluble, while the latter is not water-soluble) and, therefore, the water-resistance properties of the hardened coated film is improved. It is believed that the anticorrosive and rust preventive properties are thus improved in this manner.

In addition, since 4-aminomethyl-octamethylenediamine used in this invention has three primary amino groups and these primary amino groups remain in a high concentration after the condensation reaction as described above, this invention provides additional advantages in that the reduction in viscosity, the improvement of water-resistance properties, dispersibility of film forming ability, and the like can be achieved broadly as compared with conventional alkylenepolyamines using a modifying compound capable of an addition reaction with an active hydrogen of the amine. The modifying compound can be used in an amount of about 0.2 to 1.5 mols per mol of the polyamines. The above modifying compounds include, for example, aliphatic monoepoxides having 2 to 12 carbon atoms such as ethylene oxide, butylene oxide, 1,3-propylene oxide, 1,2-propylene oxide or 1,2-epoxy-3-butene; glycidyl ethers of aliphatic alcohols having 3 to 10 carbon atoms such as butyl glycidyl ether or allyl glycidyl ether; phenyl-substituted monoepoxides such as styrene oxide, phenyl glycidyl ether or cresyl glycidyl ether; and ethylene derivatives such as glycidyl ether, acrylonitrile, methacrylonitrile, acrylamide, methacrylamide, diacetonacrylamide, diacetonmethacrylamide, hydroxymethylacrylamide or hydroxymethylmethacrylamide.

Epoxy resins which can be used in this invention can be optionally selected from epoxy resins known in the art. Suitable examples of the epoxy resins are those disclosed in U.S. Pat. No. 2,589,245. The epoxy resins have at least two epoxy groups per molecule and are produced by the reaction of a polyhydric alcohol, a polyhydric phenol or a polyphenol such as ethylene glycol, glycerol, trimethylolpropane or 2,2-bis-(4-hydroxyphenyl)propane (bisphenol A) with an excess of an epihalohydrin such as epichlorohydrin or epibromohydrin. Also, those epoxy resins which are obtained by reacting a novolak resin, prepared by the reaction of phenol and an aldehyde, with an epihalohydrin as described above can be used. Typical epoxy resins can be produced by reacting bisphenol A with an epihalohydrin such as epichlorohydrin and can be represented by the following general formula (IV)

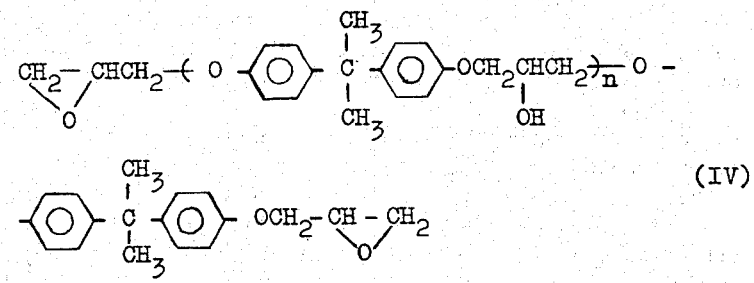

(IV)

wherein $n$ is 0 or an integer up to several tens, preferably 2 to 8, more preferably 2 to 3. In general, it is preferred that $n$ is up to 2 or 3 and the epoxide equivalent ranges from about 150 to 500, preferably 170 to 300. In addition, diluents such as a glycidyl ether of an aliphatic alcohol having 3 to 10 carbon atoms, for example, butyl glycidyl ether or allyl glycidyl ether and other commercially available diluents for epoxy resins can be added to the epoxy resins. The diluent is usually employed in an amount of 0 to about 20 parts by weight based on the weight of the epoxy resin.

The epoxy resin used in this invention can further contain additives such as a wetting agent. Examples of suitable wetting agents are commercially available nonionic wetting agents composed of a modified alkylphenol such as alkylphenoxypoly(ethyleneoxy)ethanol or nonyl phenol ethylene oxide condensate containing 9 to 10 mols of ethylene oxide. The epoxy resin aqueous dispersion can contain up to about 50% by weight water based on the total weight of the dispersion. Also, colloid stabilizing agents such as carboxymethyl cellulose, methyl cellulose, hydroxyethyl cellulose or polyvinyl alcohol can be added to the dispersion to improve the stability of the dispersion. Such colloid stabilizing agents can be used in an amount of from about 0.3 to about 8% by weight based on the amount of the epoxy resin.

The mixing ratio of the condensate of the modified fatty acid and the polyamine to the epoxy resin aqueous dispersion depends upon the type of condensate and the epoxy equivalent of the epoxy resin, but they are generally used in a molar ratio of the amine of the condensate of the epoxy group : active hydrogen being from about 1:1, preferably 0.8:1 to 1.2:1.

If desired, a metal soap or a metal oxide which is slightly soluble in water can be used in this invention as an accelerator for the air hardening reaction. Examples of these materials are metal soaps, which are generally used as driers for oil paints, such as the stearate, naphthenate or other organic acid salts of cobalt, manganese, calcium, copper, zinc, lead or the like, manganese dioxide, cobalt oxide, pulverized silicic acid, synthetic silicic acid salts, basic magnesium carbonate, magnesium silicate, magnesium oxide, bentonite and powdered mica. The amount of the metal soap or metal oxide employed is about 0.1 to 20% by weight based on the weight of the condensation product of the modified fatty acid and the polyamine, and an amount of 0.3 to 12% by weight results in satisfactory effects. The metal soap or metal oxide is preferably used for accelerating the hardening rate of the epoxy resin and at the same time for improving the physical properties of the coated films, particularly the adhesion of the coated films to the substrate.

In the preparation of a paint mixture using the epoxy resin aqueous dispersion composition of this invention, coloring pigments, extender pigemnts, rust preventive pigments, fillers, motor or other concrete substances, dispersing agents for pigments, other usual paints and coating additives, which do not adversely affect the stability of the composition when incorporated therein, can be added.

The epoxy resin aqueous dispersion composition of this invention can be coated in any manner, for example, brushing, roller coating, spraying, flow coating, dipping, doctor blade coating, stamping, troweling, etc.

The solid concentration of the above dispersion composition is preferably as high as possible, and a total solid concentration (including pigments) of about 30 to 70% by weight is usually suitable.

This invention is explained in greater detail in the following examples which, however, are not intended to be interpreted as limiting the scope of this invention. All parts, percents, ratios and the like are by weight unless otherwise indicated.

EXAMPLE 1

In a reactor equipped with a thermometer, a cooler and a stirrer, 100 parts of linseed oil fatty acid (containing 92% by weight of unsaturated acid, i.e., 42% linolenic acid, 35% linoleic acid and 15% oleic acid, by weight) and 30 parts of maleic anhydride were placed and uniformly dissolved at 130°C. Then, the temperature was increased to 200°C over a 30 minute period and the contents were stirred at this temperature for 1 hour. Thereafter, the temperature was gradually increased to 230°C and the mixture was reacted at this temperature for 1.5 hours. The reaction product was a red and viscous liquid and had an acid value of 452.

In a reactor equipped with a thermometer, a nitrogen gas inlet tube and a stirrer, were placed 115 parts of the above obtained reaction product, 50 parts of 4-aminomethyl-octamethylenediamine and 66 parts of triethylenetetramine. After purging with nitrogen gas, the temperature was increased to 180°C over a 2 hour period and then the mixture was reacted at this temperature for 1 hour. The product thus obtained was a red and viscous liquid and had an amine value of 813, a Gardner hue of 12 and a viscosity of 200 poise.

200 parts of a bisphenol A-epichlorohydrin epoxy resin having an epoxy equivalent of 186 to 192 was mixed with 4.5 parts of an alkylphenoxypoly(ethyleneoxy)ethanol wetting agent having a softening point of 42° to 43°C and containing 40 ethyleneoxy units per mol of phenol and 1.2 parts of an oilsoluble wetting agent which was liquid at ordinary temperature, an alkylphenoxypoly(ethyleneoxy)ethanol containing 4 ethyleneoxy units per mol of phenol. The mixture was heated to 65°C and 195 parts of tap water was added thereto while stirring using a laboratory-type high-speed dispersing apparatus to prepare a stable epoxy resin dispersion.

40 parts of the above hardening agent was dispersed in 60 parts of water, to which 200 parts of the above epoxy resin dispersion was added. Then, a uniform mixture was produced by stirring using a usual paint mixing rod. Next, the mixture was coated on a degreased steel surface. The transparent coated film obtained contained no bubbles in a dry film thickness of 0.30 mm. The above aqueous dispersion composition had a usable life of 2 hours at 25°C and 50% relative humidity. The term "usable life" of the composition means the period in which the composition can be used to form a uniform coated film. The time required for "set to touch" was 1 to 1.5 hours. After coating, when left at 25°C and 60% relative humidity and under a windless condition for 7 days, the coated film exhibited a pencil hardness of more than 2 H and passed a cross-cut adhesion test of 100/100, an Erichsen test of 7 mm and a Du Pont impact test of 500 g, ½ inch, 50 cm.

After being immersed in water for three months, no changes in the coated film were observed and substantially no reduction in the above physical properties was observed. After the coated film was cross-hatched by scratching and immersed in tap water for 3 months, the width of the rust formed was 2 mm. In addition, peeling and blistering were not observed. There was also no peeling in a peeling test using a cellophane tape.

EXAMPLE 2

In a reactor equipped with a thermometer, a cooler and a stirrer, 100 parts of linseed oil fatty acid and 22 parts of acrylic acid were placed and reacted at 100°C for 5 hours and further at 140°C for 3 hours. Then, 173 parts of the product thus obtained was condensed with 4-aminomethyl-octamethylene-diamine and 22 parts of triethylenetetramine in the same manner as in Example 1. The product thus obtained was a red and viscous liquid and had an amine value of 508, a Gardner hue of 11 and a viscosity of 180 poise.

55 parts of the hardening agent produced above was dispersed in 45 parts of water, to which 200 parts of the same epoxy resin dispersion as described in Example 1 was added. A uniform mixture was produced by stirring using a usual paint mixing rod. The usable life was 2 hours and the time required for "set to touch" was 1.5 hours. A coated film formed in the same manner as in Example 1 had a pencil hardness of 2 H and passed a cross-cut adhesion test of 100/100, an Erichsen test of 6.5 mm and a Du Pont impact test of 500 g, ½ inch, 50 cm. In the water resistance test, no changes were observed after 3 months, and in the anticorrosive test, the width of the rust formed was 2 mm after 3 months. Also, no changes such as blistering or peeling were observed.

EXAMPLES 3–14

Hardening agents were synthesized from the compositions shown in Table 1 in the same manner as in Examples 1 and 2. Each of the hardening agents was evaluated using the same tests as in Example 1. The results obtained are shown in Table 2.

Table 1

| Example | Fatty Acid[5] | Modifying Method Reactant | Reaction Ratio[1] | Polyalkylene-polyamine | Reaction Ratio[4] |
|---|---|---|---|---|---|
| 3 | Linseed oil fatty acid | Maleic anhydride | 1:1 | TETA[2] | 0.25:0.75 |
| 4 | " | " | 1:1 | " | 0.75:0.25 |
| 5 | " | " | 0.5:1 | " | 0.5:0.5 |
| 6 | " | " | 1:1 | DETA[3] | 0.5:0.5 |
| 7 | " | Acrylic acid | 1:1 | TETA | 0.5:0.5 |
| 8 | Corn oil fatty acid | Maleic anhydride | 1:1 | " | 0.5:0.5 |
| 9 | Soybean oil fatty acid | " | 1:1 | " | 0.5:0.5 |
| 10 | " | Acetylene-dicarboxylic acid | 1:1 | " | 0.5:0.5 |
| 11 | Tung oil fatty acid | Maleic anhydride | 1:1 | " | 0.5:0.5 |
| 12 | " | " | 0.5:1 | " | 0.5:0.5 |
| 13 | Tall oil fatty acid | Methyl methacrylate | 0.5:1 | Tetraethylene-pentamine | 0.5:0.5 |
| 14 | Methyl ester of tall oil fatty acid | Dimethyl maleate | 0.5:1 | Di-1,3-propane-triamine | 0.5:0.5 |

[1] Molar ratio of reactant to the unsaturated fatty acid in the fatty acid
[2] TETA: Triethylenetetramine
[3] DETA: Diethylenetriamine
[4] Molar ratio of polyalkylene polyamine to 4-aminomethyl-octamethylenediamine
[5] The oils used in these examples comprise the following fatty acids (by weight):

| Fatty Acids | Unsaturated Acids Oleic Acid | Linoleic Acid | Linolenic Acid | α-Eleostearic Acid |
|---|---|---|---|---|
| Corn oil | 42% | 48% | — | — |
| Soybean oil | 32% | 55% | 3% | — |
| Tung oil | 15% | — | — | 80% |
| Tall oil | 47% | 46% | — | — |

Table 2

| Example | Amount Added (phr) | Pencil Hardness | Cross-cut Adhesion Test | Erichsen Test (mm) | Du Pont Impact Test (500g, ½") (cm) | Immersion in Distilled Water for 3 Months | Scratching and Immersion in Tap Water for 3 Months (width of rust in mm) |
|---|---|---|---|---|---|---|---|
| 3 | 33 | 2H | 100/100 | 8 | 45 | Some spot stains | 2 |
| 4 | 33 | >2H | 98/100 | 7 | 40 | No changes | 3 |
| 5 | 60 | 2H | 100/100 | 8 | 50 | " | 2 |
| 6 | 40 | 2H | 100/100 | 8 | 50 | " | 1.5 |
| 7 | 39 | 2H | 100/100 | 7 | 45 | " | 2 |
| 8 | 33 | 2H | 100/100 | 7 | 50 | " | 2 |
| 9 | 33 | 2H | 100/100 | 8 | 50 | " | 2 |
| 10 | 33 | 2H | 100/100 | 8 | 50 | " | 1.5 |
| 11 | 33 | 2H | 100/100 | 8 | 45 | " | 1.5 |
| 12 | 33 | 2H | 100/100 | 7 | 45 | " | 2 |
| 13 | 30 | H | 100/100 | 7 | 40 | " | 3 |
| 14 | 33 | H | 100/100 | 6 | 35 | " | 2 |

EXAMPLE 15

50 parts of linoleic acid and 50 parts of linolenic acid were reacted with 12 parts of acrylic acid and 10 parts of maleic anhydride in the same manner as in Example 2. 145 parts of the product thus obtained was reacted with 50 parts of 4-aminomethyl-octamethylenediamine and 66 parts of tri-1,3-propanetetramine in the same manner as in Example 1. The product thus obtained had an amine value of 350 and a viscosity of 50 poise.

The above hardening agent was tested in the same manner as in Example 1 and the results obtained were a pencil hardness of H, a cross-cut adhesion test of 100/100, an Erichsen test of 6.5 mm and a Du Pont impact test of 40 cm. In the water resistance test, no changes were observed after 3 months. The width of the rust formed was 3 mm and no changes such as blistering or peeling were observed.

EXAMPLE 16

55 parts of methyl linoleate and 55 parts of methyl αeleostearate were reacted with 20 parts of methyl methacrylate and 15 parts of dimethyl maleate in the same manner as in Example 2. Then, 160 parts of the product thus obtained was reacted with 50 parts of 4-aminomethyl-octamethylenediamine and 66 parts of di-1,2-propanetriamine in the same manner as in Example 1 to produce a product having an amine value of 330 and a viscosity of 45 poise.

The above hardening agent was tested in the same manner as in Example 1. The results obtained were a pencil hardness of H, a cross-cut adhesion test of 100/100, an Erichsen test of 6.5 mm and a Du Pont impact test of 45 cm. In the water resistance test for 3 months, no changes were observed and the width of the rust formed was 4 mm.

EXAMPLE 17

70 parts of the methyl ester of linseed oil fatty acid and 40 parts of the methyl ester of tung oil fatty acid were reacted with 30 parts of methyl acrylate in the same manner as in Example 2. Then, 200 parts of the product thus obtained was reacted with 75 parts of 4-aminomethyl-octamethylenediamine and 40 parts of ethylenediamine in the same manner as in Example 2 to produce a product having an amine value of 520 and a viscosity of 20 poise.

The above hardening agent was tested in the same manner as in Example 1. The results obtained were a pencil hardness of H, a cross-cut adhesion test of 100/100, an Erichsen test of 7.0 mm and a Du Pont impact test of 40 cm. In the water resistance test for 3 months, no changes were observed and the width of the rust formed was 3.5 mm.

EXAMPLE 18

A hardening agent was prepared in the same manner as in Example 17 except for the use of linseed oil and tung oil in place of the methyl ester of linseed oil fatty acid and the methyl ester of tung oil fatty acid. The hardening agent had an amine value of 510 and a viscosity of 22 poise.

A coated film prepared using hte above hardening agent had almost the same physical properties as those of the coated film prepared in Example 17.

EXAMPLE 19

100 parts of linseed oil fatty acid was reacted with 25 parts of acrylic acid in the same manner as in Example 2. Then, 200 parts of the product thus obtained was reacted with 75 parts of 4-aminomethyl-octamethylenediamine, 43 parts of diethyltriamine and 65 parts of triethylenetetramine in the same manner as in Example 1 to produce a product having an amine value of 450 and a viscosity of 35 poise.

The above hardening agent was tested in the same manner as in Example 1. The results obtained were a pencil hardness of 2H, a cross-cut adhesion test of 100/100, an Erichsen test of 8.0 mm and a Du Pont impact test of 50 cm. In the water resistance test for 3 months, no changes were observed and the width of the rust formed was 3 mm.

EXAMPLE 20

An epoxy resin aqueous dispersion was prepared by dispersing in the same manner as in Example 1 a mixture of 120 parts of a bisphenol A-epichlorohydrin epoxy resin having an epoxy equivalent of 186 to 192, 40 parts of a resin having an epoxy equivalent of 475 to 575, a melting point of 70° to 80°C and a molecular weight of about 900 and 40 parts of butyl glycidyl ether.

A condensate of 100 parts of 4-aminomethyl-octamethylene-diamine with 115 parts of the reaction product of 100 parts of linseed oil fatty acid and 30 parts of maleic acid, and the condensate of 132 parts of triethylenetetramine with 120 parts of a reaction product of 100 parts of corn oil fatty acid and 34 parts of acetylenedicarboxylic acid were mixed in equal amount to produce a hardening agent.

35 parts of the mixed hardening agent was dispersed in 65 parts of water, to which 200 parts of the above epoxy resin dispersion was added. The mixture was coated on a steel surface in the same manner as in Example 1.

When left at 25° C and 60% relative humidity for 7 days after coating, the coated film exhibited a pencil hardness of 2 H and passed a cross-cut adhesion test of 100/100, an Erichsen test of 7.5 mm and a Du Pont impact test of 500 g, ½ inch, 50 cm. After the coated film was immersed in distilled water for 3 months, no changes were observed. In the test of cross-hatching and immersion in tap water for 3 months, the width of the rust formed was 2 mm.

EXAMPLE 21

33 parts of iron oxide and 25 parts of tap water were added to 100 parts of the epoxy resin aqueous dispersion composition of Example 1, and uniformly dispersed therein on a threeroll mill. The dispersion thus obtained was coated on a steel surface. The usable life was 2 hours in a closed state and the time required for "set to touch" was 1 hour. After 7 days, the coated film exhibited a pencil hardness of 4 H and passed a cross-cut adhesion test of 100/100, an Erichsen test of 7 mm and a Du Pont impact test of 500 g, ½ inch, 45 cm. After being immersed in distilled water for 3 months, no changes in the coated film were observed. In the test of scratching and immersion in tap water for 3 months, the width of the rust formed was 1 mm and no changes such as blistering were observed. When the coated film which had been immersed in distilled water for 3 months was scratched and immersed in tap water for 3 months, the width of the rust was 1.5 mm. Moreover, when the coated film was immersed in a 3% aqueous sodium chloride solution at 60°C for 1 month, no changes such as blistering or discoloring were observed.

EXAMPLE 22

33 parts of iron oxide and 25 parts of tap water were added to 100 parts of an epoxy resin aqueous dispersion composition, which had been prepared in the same manner as in Example 2 except that 0.04% (as cobalt metal) of cobalt naphthenate and 0.03% (as manganese metal) of manganese naphthenate were added to the hardening agent of Example 2, and uniformly dispersed therein on a three roll mill to produce a paint composition.

The paint composition was tested in the same manner as in Example 1. The results obtained were a pencil hardness of 3 H, a cross-cut adhesion test of 100/100, an Erichsen test of 8 mm and a Du Pont impact test of 50 cm. In the water resistance test for 3 months, no changes were observed and the width of the rust formed was <1 mm. Moreover, when the coated film was immersed in a 3% aqueous sodium chloride solution at 60°C for 1 month, no changes such as blistering or discoloring were observed.

EXAMPLE 23

55 parts of the hardening agent of Example 2 was dispersed in 45 parts of water, which was added to 290 parts of an epoxy resin dispersion prepared by dispersing 100 parts of a bisphenol A-epichlorohydrin epoxy resin having an epoxy equivalent of 186 to 192, 65 parts of liquid tar having a viscosity of 1500 to 3000 cps at 25°C, 10 parts of pulverized silica, 10 parts of mica, 5 parts of a bentonite thickener and the same wetting agent as in Example 1, i.e., 4.3 parts of an alkylphenoxypoly(ethylenoxy)ethanol wetting agent having a softening point of 42° to 43°C and containing 40 ethyleneoxy units per mol of phenol and 1.7 parts of an oil-soluble wetting agent which was liquid at ordinary temperature, an alkylphenoxypoly(ethyleneoxy)ethanol containing 4 ethyleneoxy units per mol of phenol, in 195 parts of tap water, and uniformly dispersed therein on a three roll mill to produce a paint composition.

The paint composition was tested in the same manner as in Example 1. The results obtained were a pencil hardness of HB, a cross-cut adhesion test of 100/100, an Erichsen test of 8 mm and a Du Pont test of 50 cm. In the water resistance test for 3 months, no changes were observed and the width of the rust formed was <1 mm. Moreover, when the coated film was immersed in a 3% aqueous sodium chloride solution at 60°C for 1 month, no changes such as blistering or discoloring were observed.

Comparative examples are described hereinafter for the purpose of showing that the polyamide or aminoamide of this invention prepared from a polyamine mixture of 4-aminomethyloctamethylenediamine and polyalkylenepolyamine is excellent as a hardening agent for an epoxy resin aqueous dispersion as compared with the conventional hardening agents prepared from a polyalkylenepolyamine alone.

COMPARATIVE EXAMPLE 1

115 parts of modified linseed oil fatty acid prepared as in Example 1 and 132 parts of triethylenetetramine were condensed in the same manner as in Example 1. 33 parts of the hardening agent thus obtained was dispersed in 67 parts of water, to which 200 parts of the epoxy resin aqueous dispersion of Example 1 was added. The mixture was coated on a steel surface. The time required for "set to touch" was 1.5 hours. After 7 days, the coated film exhibited a pencil hardness of 2 H and passed a cross-cut adhesion test of 96/100, an Erichsen test of 7 mm and a Du Pont impact test of 500 g, ½ inch, 45 cm. In the test of immersion in distilled water for 1 month, the coated film became entirely white-opaque. In the test of scratching and immersion in tap water for 1 month, the width of the rust formed was 3 mm and peeling occurred partially.

COMPARATIVE EXAMPLE 2

A hardening agent was prepared in the same manner as in Comparative Example 1 except for the use of diethylenetetramine in place of triethylenetetramine. The use of the hardening agent resulted in a shrinkage in the coated film and thus uniform coated films were not formed.

COMPARATIVE EXAMPLE 3

An epoxy resin aqueous dispersion, in which polyaminoamide prepared from a conventional polymeric fatty acid (containing more than 80% of dimer acid) and diethylenetriamine and having an amine value of 290 to 430 and a viscosity of 80 to 120 poise (at 40°C) was used as a hardening agent, was tested in the same manner as in Example 1. The results obtained were a pencil hardness of B, a cross-cut adhesion test of 100/100, an Erichsen test of 8 mm and a Du Pont impact test of 50 cm. In the water resistance test, the coated film peeled one week after the immersion.

COMPARATIVE EXAMPLE 4

A hardening agent was prepared in the same manner as in Comparative Example 3 except for the use of 4-aminomethyl-octamethylenediamine in place of diethylenetriamine. The hardening agent was insufficiently dispersed in water and desirable physical properties were not obtained.

COMPARATIVE EXAMPLE 5

The hardening agent was prepared in the same manner as in Comparative Example 3 except for the use of a 1:1 by weight polyamine mixture of diethylenetriamine and 4-aminomethyl-octamethylenediamine. The use of the hardening agent provided the following test results: a pencil hardness of B, a cross-cut adhesion test of 100/100, an Erichsen test of 8 mm and a Du Pont impact test of 50 cm. However, in the water resistance test, the coated film tended to peel after 1 month, and in a peeling test using a cellophane tape, the film completely peeled.

COMPARATIVE EXAMPLE 6

An epoxy resin aqueous dispersion was prepared by adding cobalt naphthenate and manganese naphthenate in the same ratio as in Example 22 to a hardening agent produced by the reaction of linseed oil fatty acid, not modified with an $\alpha,\beta$-unsaturated carboxylic acid, as a carboxylic acid component with a 1:1 by weight polyamine mixture of diethylenetriamine and 4-aminomethyl-octamethylenediamine.

The use of the epoxy resin aqueous dispersion provided the following test results: a pencil hardness of HB, a cross-cut adhesion test of 100/100, an Erichsen test of 9 mm and a Du Pont impact test of 50 cm. In the water resistance test for 1 month, the coated film turned white and exhibited poor adhesion.

The composition of this invention forms coated films having, in addition to the usual effects of aqueous paints, superior physical properties, particularly water resistance, rust preventative and anticorrosive properties, as compared with the use of conventional hardening agents prepared from an alkylenepolyamine. Specifically, the coated film according to this invention, when immersed in distilled water, does not become white-opaque and no stains, peeling or blistering occur. Thus, the rust preventive and anticorrosive properties are improved.

While the invention has been described in detail and with reference to specific embodiments thereof, it will be apparent to one skilled in the art that various changes and modifications can be made therein without departing from the spirit and scope thereof.

What is claimed is:
1. An epoxy resin aqueous composition comprising an aqueous dispersion containing
A. an epoxy resin having at least two epoxy groups per molecule, and
B. a condensation product prepared by condensing
i. a polyamine mixture of 4-aminomethyl-octamethylenediamine and a polyalkylenepolyamine represented by the general formula (III)

$$H_2N-R-NH-(RNH)_n-H \qquad (III)$$

wherein R is a straight-chain alkylene group having 2 to 4 carbon atoms and $n$ is 0 or an integer of 1 to 6 in a molar ratio of 4-aminomethyloctamethylene diamine to the polyalkylenepolyamine of about 1:4 to 4:1, with
ii. a reaction product of a. an α,β-unsaturated carboxylic acid or a $C_1$–$C_4$ ester thereof represented by the following general formula (I) or (II)

$$Y-CH=CX-Y \qquad (I)$$

$$Y-C\equiv C-Y \qquad (II)$$

wherein Y is a hydrogen atom, an alkyl group, a carboxyl group or an esterified carboxyl group with at least one of Y being a carboxyl group or an esterified carboxyl group; and X is a hydrogen atom or a methyl group; and b. a natural or synthetic ethylenically unsaturated monocarboxylic fatty acid or an alkyl ester thereof, the molar proportion of the α,β-unsaturated carboxylic acid or ester thereof to the ethylenically unsaturated monocarboxylic fatty acid or ester thereof ranging from about 1:0.2 to 1:1.0; and the proportion of said polyamine mixture (i) to said reaction product (ii) ranging from about 0.3 to 1.3 mol per equivalent of acid.

2. The composition as claimed in claim 1, wherein said α,β-unsaturated carboxylic acid or ester thereof is selected from the group consisting of acrylic acid, an ester of acrylic acid, maleic anhydride, an ester of maleic anhydride and a mixture thereof.

3. The composition as claimed in claim 1, wherein said natural or synthetic ethylenically unsaturated monocarboxylic fatty acid or alkyl ester thereof is selected from the group consisting of linoleic acid, linolenic acid, α-eleostearic acid, an ester thereof, and a mixture thereof or is selected from the group consisting of linseed oil fatty acid, tall oil fatty acid and tung oil fatty acid, each containing said natural or synthetic ethylenically unsaturated monocarboxylic fatty acid as an essential component, an ester thereof and a mixture thereof.

4. The composition as claimed in claim 1, wherein said polyalkylenepolyamine is selected from the group consisting of diethylenetriamine, triethylenetetramine, tetraethylenepentamine and a mixture thereof.

5. The composition as claimed in claim 1, including a metal soap or a metal oxide that is slightly soluble in water.

6. The composition as claimed in claim 1, including a pigment.

7. The composition as claimed in claim 5, including a pigment.

* * * * *